Sept. 22, 1959  K. CUPÁK  2,905,002
ROTATIONAL COUPLING DEVICE
Filed Sept. 25, 1956  3 Sheets-Sheet 1

INVENTOR.
Karel Cupák
BY

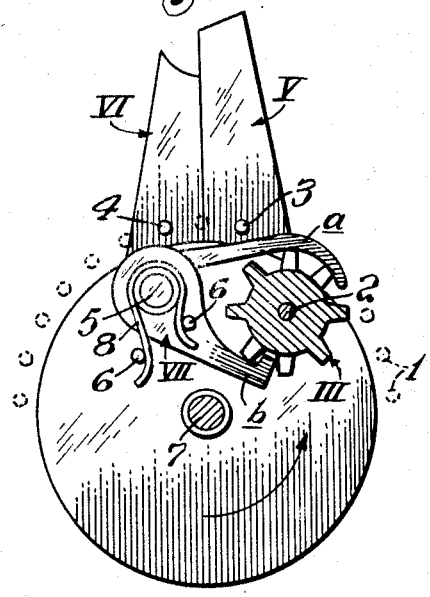
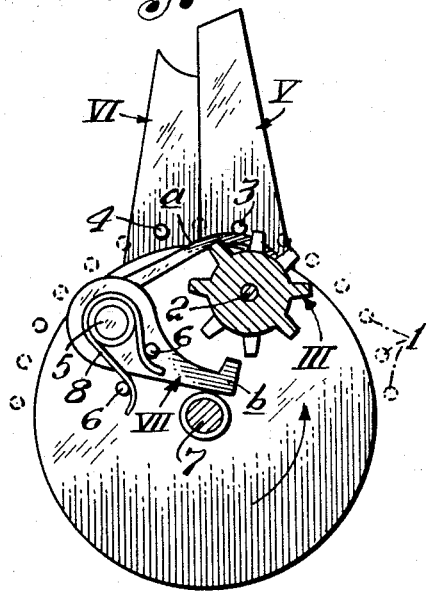
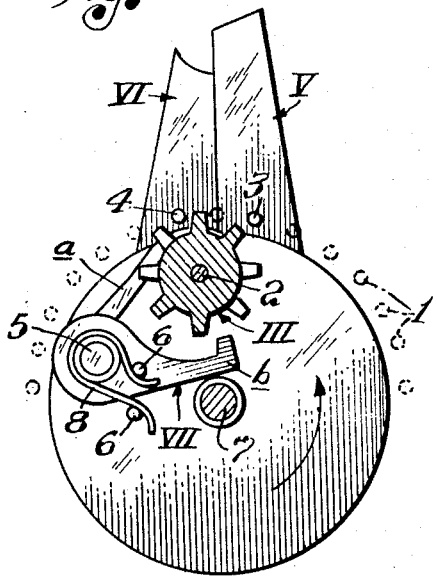
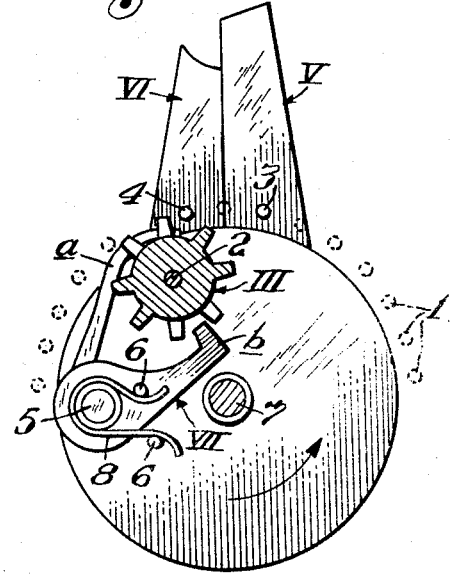

Sept. 22, 1959 K. CUPÁK 2,905,002
ROTATIONAL COUPLING DEVICE
Filed Sept. 25, 1956 3 Sheets-Sheet 3

INVENTOR.
Karel Cupák

United States Patent Office 2,905,002
Patented Sept. 22, 1959

2,905,002

ROTATIONAL COUPLING DEVICE

Karel Cupák, Brno, Czechoslovakia, assignor to Koh-i-noor Proseč n. Nisou, narodni podnik, Prosec nad Nisou, Czechoslovakia Application September 25, 1956, Serial No. 611,996

5 Claims. (Cl. 74—84)

The present invention relates generally to a rotational coupling device, and more particularly is directed to a rotational coupling device for intermittently connecting a rotated driving member to a coaxially mounted driven member for an adjustably predetermined period of connection.

It is an object of the invention to provide a rotational coupling device which makes possible the periodic or intermittent coupling of a rotated driving member with a coaxially mounted driven member which is normally at rest so that the driven member will be turned, during each revolution of the driving member, only through an angular displacement which is adjustably predetermined.

In accordance with an aspect of the present invention, the coupling device comprises a rotated driving member, a driven member mounted for rotation coaxially with the driving member and having a circularly arranged series of teeth thereon, a coupling gear rotatably carried by the driving member with its axis being offset radially from the axis of the driving member, and with the coupling gear having gaps in the teeth thereon so that, in response to turning of the coupling gear relative to the driving member, the coupling gear moves between an engaged position, where teeth on the coupling gear mesh with the teeth on the driven member, and a disengaged position, where one of the gaps of the coupling gear faces toward the teeth of the driven member, releasable arresting means for halting the turning of the coupling gear relative to the driving member so that, when the coupling gear is halted in its engaged position, the coupling gear transmits the rotation of the driving member to the driven member, and first and second pins adjustably disposed at spaced apart, normally stationary locations where the first and second pins successively release the arresting means while turning the coupling gear from a disengaged position to an engaged position and from an engaged position back to the disengaged position, respectively, so that the period during which the coupling gear transmits the rotation of the driving member to the driven member is adjustably determined by the spacing between the first and second pins.

In accordance with another aspect of the invention, the coupling gear has an even number of teeth and axially overlaps the teeth of the driven member for one-half of the axial width of the teeth on the coupling gear, with alternate pairs of the teeth of the coupling gear being cut away over that one-half of the axial width in order to define the previously mentioned gaps, while the first and second pins for releasing the arresting means and for turning the coupling gear are disposed on the pitch circle of the teeth of the driven member and successively engage the teeth of the coupling gear at the other half of the width thereof to each effect the turning of the coupling gear through an angle subtended by twice the pitch of the teeth on the latter.

Further, the coupling device embodying the invention is featured by an arresting means for the coupling gear that includes a pawl pivotally mounted on the driving member and engageable with the teeth of the coupling gear, spring means urging the pawl into engagement with the teeth of the coupling gear, and a releasing arm fixed with respect to the pawl and following a path into which the first and second pins project so that, as the driving member rotates, the first and second pins successively engage the releasing arm to rock the latter in the direction for freeing the pawl from the teeth of the coupling gear.

The above, and other objects, features and advantages of the invention, will be apparent in the following detailed description of an illustrative embodiment thereof which is to be read in connection with the accompanying drawings forming a part hereof, and wherein:

Fig. 6 is a sectional view taken along the line 6—6 of Fig. 1, and showing the coupling device in a condition where the driving member is free to rotate with respect to the driven member;

Figure 1:
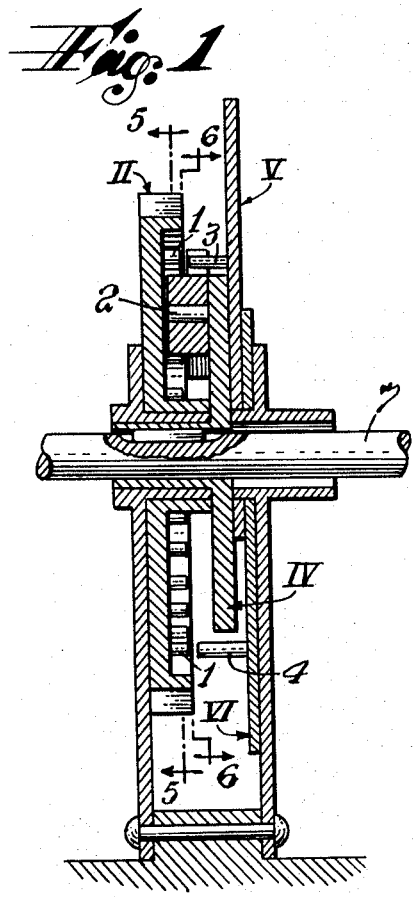
Fig. 1 is an axial sectional view of a rotational coupling device embodying the present invention.
Figure 2:
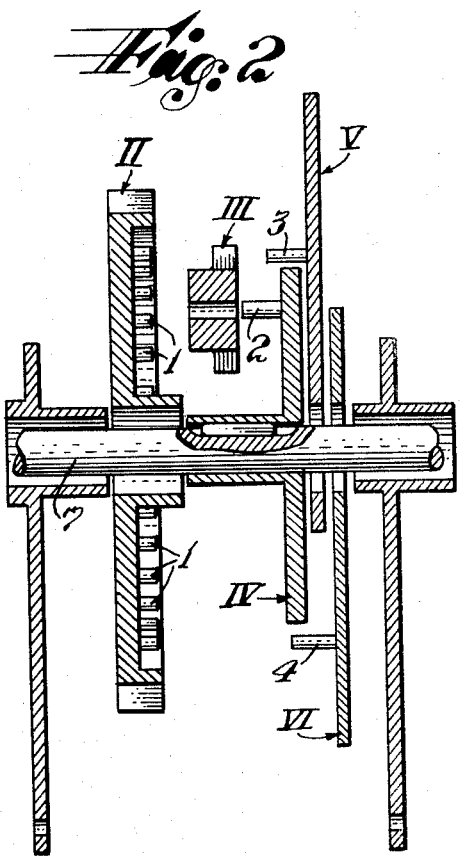
Fig. 2 is a view similar to that of Fig. 1, but with the various illustrated parts of the coupling device being shown in axially exploded or spaced apart relationship.

Figs. 7, 8 and 9 are views similar to that of Fig. 6, but showing further successive stages in the operation of the coupling device when the latter is adjusted for free rotation of the driving member relative to the driven member; and Figs. 10, 11, 12 and 13 are additional views similar to that of Fig. 6, but showing the successive stages of the operation of the coupling device when the latter is adjusted for effecting periodic rotation of the driven member with the driving member.

The coupling device illustrated in the drawings includes a rotated driving member IV fixed on a rotated shaft 7, and an independently rotatable driven member II coaxial with the driving member IV. The driven member II is provided with a circularly arranged series of teeth 1 forming an internal gear (Fig. 5) and adapted to be engaged by teeth on a coupling gear III (Figs. 3 and 5) which is rotatably mounted on a pin 2 carried by the driving member IV and offset radially with respect to the axis of rotation of the latter.

Figure 3:
Fig. 3 is a side view of a coupling gear included in the device of Figs. 1 and 2.
Figure 5:
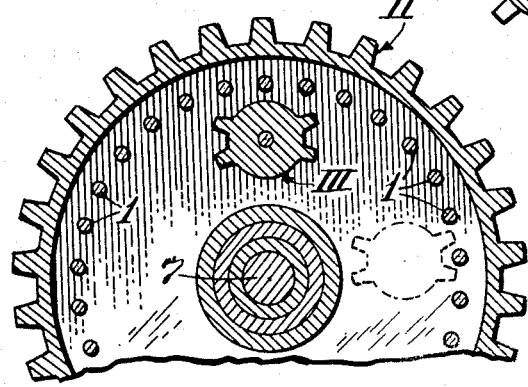
Fig. 5 is a sectional view taken along the line 5—5 of Fig. 1, with the coupling gear being shown in full lines in its disengaged position and, in broken lines, in its engaged position.

Only one-half of the coupling gear III extends axially into the internal gear of the driven member II, and that one-half of the coupling gear has alternate pairs of its teeth cut away, as shown in Figs. 3 and 5, so that, when the coupling gear is in the position illustrated in full lines in Fig. 5, hereinafter referred to as the disengaged position, the coupling gear can rotate with the driving member IV without entraining the driven member II, that is, without transmitting rotation from the driving member to the driven member. On the other hand, when the coupling gear III is turned to the position illustrated in dotted lines on Fig. 5, hereinafter referred to as the engaged position, then teeth of the coupling gear engage teeth 1 of the driven member II. If the coupling gear III is retained in its engaged position while the driving member IV is rotated, the coupling gear will serve to transmit rotation from the driving member to the driven member.

Figure 4:
Fig. 4 is a side view of an arresting member also included in the coupling device of Figs. 1 and 2.
Figure 10:
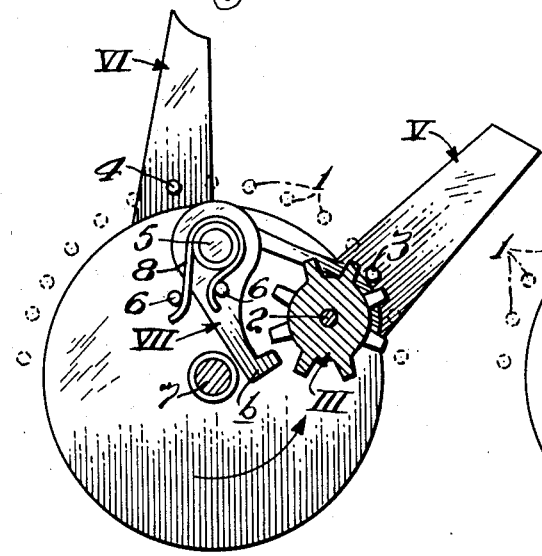
Figure 11:
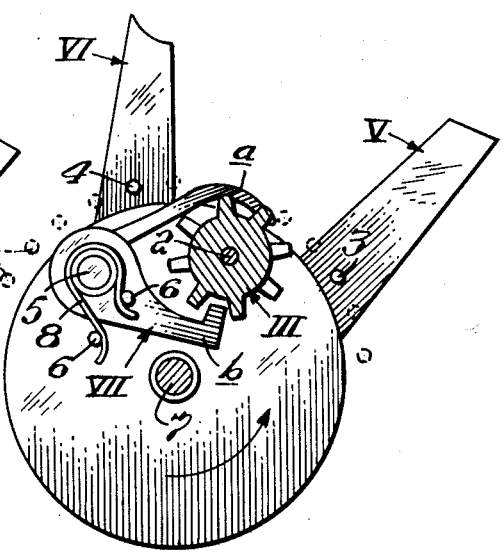
Figure 12:
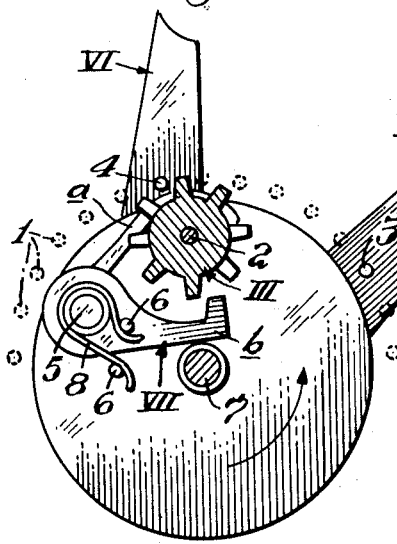
Figure 13:
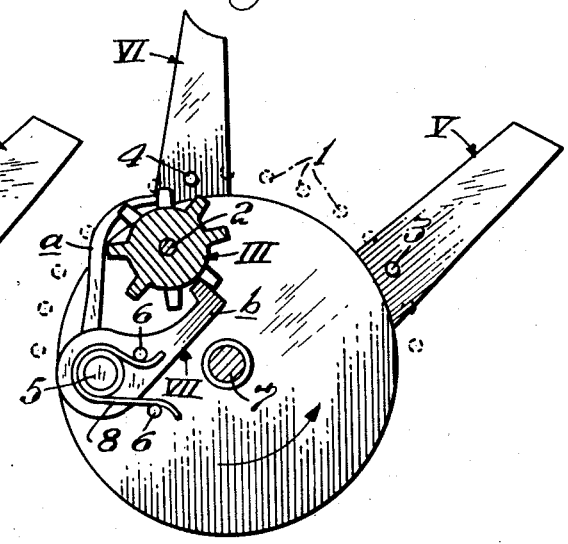

The coupling gear III is releasably held against rotation on its pivot 2 by an arresting member VII (Fig. 4) that includes a pawl $b$ engageable with the teeth of the coupling gear over the half of the latter which projects axially out of the internal gear of driven member II (Fig. 6). The pawl *b* is rockably mounted on a pivot 5 which is also carried by the driving member IV and is urged into engagement with the teeth of the coupling gear by means of a light spring 8. The arresting member VII is completed by an actuating arm *a* which is fixed with respect to the pawl *b* and which projects beyond the periphery of the driving member IV.

The disclosed coupling device is completed by two arms V and VI which are normally stationary during operation of the coupling, but which are mounted for adjustable pivoting movement coaxially with the shaft 7 and carry axially projecting pins 3 and 4 which lie on the pitch circle of the internal gear of driven member II, that is, which are spaced radially from the axis of shaft 7 by a distance equal to the radius of the pitch circle of the teeth 1 forming the internal gear of the driven member. When the above described parts of the clutch device are assembled together, as in Fig. 1, the pins 3 and 4 project into the path of movement of the arm *a* of the arresting member and also into the path of movement of the uninterrupted teeth on the coupling gear III. Thus, when the driving member IV is rotated in the counter-clockwise direction, as viewed in Figs. 6 to 9, inclusive, and assuming that the coupling gear III is initially in a disengaged position, as in Fig. 6, so that rotation of the driving member is not transmitted to the driven member, it will be apparent that the arm *a* of the arresting member VII will first be engaged by the pin 3, (Fig. 7) thereby to rock the pawl *b* out of engagement with the teeth of the coupling gear III for permitting turning of the latter about its pivot 2. As the pin 3 engages the arm *a* of coupling member VII, it will simultaneously also engage the teeth of the coupling gear III so that, as the latter moves past the pin 3, the coupling gear III will be turned through an angle subtended by two of its teeth for displacement from its original disengaged position to an engaged position (Fig. 7).

If the pawl *b* is permitted to return into engagement with the gear III while the latter is still in its engaged position, thereby to retain the coupling gear in its engaged position, the coupling gear will serve to transmit rotation from the driving member IV to the driven member II.

However, when the arm *a* of the arresting member VII engages the pin 4 during continued rotation of the driving member IV, as in Fig. 8, the arresting pawl *b* will again be released to permit further turning of the coupling gear III about its pivot 2, and the pin 4 will simultaneously engage the teeth of the coupling gear to again turn the latter through an angle subtended by two teeth thereof, thereby to return the coupling gear to a disengaged position for interrupting the transmission of rotational movement from the driving member to the driven member, as in Fig. 9.

Thus, it will be apparent that the angular displacement of the driven member II during each revolution of the driving member IV will depend upon the circumferential spacing between the pins 3 and 4. Such circumferential spacing between the pins 3 and 4 is variable merely by angularly displacing the related arms V and VI. When the pins 3 and 4 are spaced apart by a basic distance, that is, a distance equal to twice the pitch of the internal gear of the driven member II, as in Figs. 6 to 9, inclusive, the pin 4 will be engaged by the arm *a* of the arresting member VII prior to the release of that arm from the pin 3 so that the arresting member will be held in its released condition without interruption and the pins 3 and 4 will successively angularly displace the coupling gear III from its orignal disengaged position back to a disengaged position, without interruption, thereby to avoid the transmission of any rotational movement from the driving member to the driven member. As the pins 3 and 4 are moved further apart, as in Figs. 10 to 13, inclusive, the period during which rotational movement is transmitted to the driven member will be correspondingly extended.

Thus, referring in detail to Figs. 10 to 13, inclusive, it will be seen that the arm *a* of the arresting member VII initially engages the pin 3 of arm V in order to rock the pawl *b* out of engagement with the teeth of the coupling gear III (Fig. 10), and the pin 3 simultaneously engages the teeth of the coupling gear to turn the latter to an engaged position. By reason of the relatively large angular spacing between the arms V and VI in Figs. 10 to 13, inclusive, the arm *a* of arresting member VII is released by the pin 3 to permit return of the pawl *b* into engagement with the teeth of the coupling gear III for holding the latter in its engaged position, as in Fig. 11, prior to the engagement of the arm *a* of arresting member VII with the pin 4. Thus, the coupling gear III will be effective to transmit the rotation of the driving member IV to the driven member II during the angular displacement of the driving member from the position where the arm *a* of the arresting member is released from the pin 3 to the position where that arm is again engaged by the pin 4, as in Fig. 12. When arm *a* of the arresting member is engaged by pin 4, the pawl *b* of the arresting member is disengaged from the teeth of the coupling gear while such teeth are simultaneously engaged by the pin 4 to turn the coupling gear from its engaged position to a disengaged position, as in Fig. 13, so that the driven member is again uncoupled from the driving member.

Although an illustrative embodiment of the invention has been described in detail herein with reference to the accompanying drawings, it is to be understood that the invention is not limited to that precise embodiment, and that various changes and modifications may be effected therein without departing from the scope or spirit of the invention, except as defined in the appended claims.

I claim:

1. A coupling device comprising a rotated driving member, a driven member mounted for rotation coaxially with said driving member and having a circularly arranged series of teeth thereon, a coupling gear rotatably carried by said driving member with the axis of said coupling gear being off-set radially from the axis of said driving member, said coupling gear having gaps in the teeth thereon so that, in response to turning of said coupling gear relative to said driving member, said coupling gear moves between an engaged position, where teeth on the coupling gear mesh with said teeth on the driven member, and a disengaged position, where one of said gaps face toward said teeth of the driven member, releasable arresting means for halting turning of said coupling gear relative to said driving member so that, when turning of said coupling gear is halted in said engaged position, said coupling gear transmits the rotation of said driving member to said driven member, and first and second pins adjustably disposed at spaced apart, normally stationary locations where said first and second pins successively release said arresting means while turning said coupling gear from said disengaged position to said engaged position, and from said engaged position to said disengaged position, respectively, so that the period during which said coupling gear transmits the rotation of said driving member to said driven member is determined by the spacing between said first and second pins.

2. A coupling device as in claim 1; wherein said coupling gear has an even number of teeth and axially overlaps said teeth of the driven member for one half of the axial width of said teeth of the coupling gear, alternate pairs of said teeth of the coupling gear being cut away over said one half of the axial width to define said gaps; and wherein said first and second pins are disposed on the pitch circle of said teeth of the driven member and successively engage said teeth of the coupling gear at the other half of the width thereof to each effect the turning of said coupling gear through an angle subtended by twice the pitch of the teeth on the latter.

3. A coupling device as in claim 2; wherein said arresting means includes a pawl pivotally mounted on said driving member and engageable with the teeth of said coupling gear at said other half of the width thereof, spring means urging said pawl into engagement with the teeth of said coupling gear, and a releasing arm fixed with respect to said pawl and following a path into which said pins project so that, as said driving member rotates, said pins successively engage said releasing arm to rock the latter in the direction for freeing said pawl from the teeth of said coupling gear.

4. A coupling device as in claim 3; further comprising first and second arms carrying said first and second pins, respectively, and pivot means coaxial with said axis of the driving member and pivotally supporting said arms so that the latter can be angularly displaced relative to each other to vary the spacing therebetween while said pins remain on the pitch circle of said teeth of the driven member.

5. A coupling device as in claim 3; wherein said teeth on the driven member are in the form of an internal gear, and said coupling gear is a relatively small planetary pinion extending axially into said internal gear.

References Cited in the file of this patent
UNITED STATES PATENTS

| | | |
|---|---|---|
| 2,488,143 | Rouan | Nov. 15, 1949 |
| 2,530,996 | Russell | Nov. 21, 1950 |